United States Patent
Jevons et al.

(10) Patent No.: US 8,851,421 B2
(45) Date of Patent: Oct. 7, 2014

(54) AEROFOIL WITH EROSION RESISTANT LEADING EDGE

(75) Inventors: Matthew P. Jevons, Derby (GB); Kristofer J. Bottome, Nottingham (GB)

(73) Assignee: Rolls-Royce PLC, London (GB)

( * ) Notice: Subject to any disclaimer, the term of this patent is extended or adjusted under 35 U.S.C. 154(b) by 608 days.

(21) Appl. No.: 12/852,810

(22) Filed: Aug. 9, 2010

(65) Prior Publication Data

US 2011/0049297 A1 Mar. 3, 2011

(30) Foreign Application Priority Data

Sep. 1, 2009 (GB) .................... 0915087.1

(51) Int. Cl.
*B64C 1/00* (2006.01)
*B64C 3/00* (2006.01)
*B64C 5/00* (2006.01)
*F01D 5/28* (2006.01)

(52) U.S. Cl.
CPC ............... *F01D 5/282* (2013.01); *F01D 5/284* (2013.01); *Y02T 50/673* (2013.01); *F05D 2300/603* (2013.01); *F05D 2300/614* (2013.01); *Y02T 50/672* (2013.01)
USPC ...................................... 244/123.1

(58) Field of Classification Search
USPC ............... 416/224, 230, 61, 226, 229 R; 244/123.1
See application file for complete search history.

(56) References Cited

U.S. PATENT DOCUMENTS

| | | | |
|---|---|---|---|
| 1,860,557 A | 5/1932 | Sukohl | |
| 2,431,184 A | 11/1947 | Martin et al. | |
| 3,762,835 A | 10/1973 | Carlson et al. | |
| 3,892,612 A | 7/1975 | Carlson et al. | |
| 4,006,999 A | 2/1977 | Brantley et al. | |
| 4,842,663 A | 6/1989 | Kramer | |
| 5,174,024 A | 12/1992 | Sterrett | |
| 5,346,367 A * | 9/1994 | Doolin et al. ................. | 416/230 |
| 5,449,273 A | 9/1995 | Hertel et al. | |
| 5,486,096 A | 1/1996 | Hertel et al. | |
| 5,725,354 A * | 3/1998 | Wadia et al. .................. | 416/224 |
| 5,951,254 A | 9/1999 | Sikorski et al. | |
| 6,132,857 A | 10/2000 | Champenois et al. | |
| 7,435,056 B2 * | 10/2008 | Liston ........................... | 416/230 |
| 2005/0271881 A1 * | 12/2005 | Hong ............................. | 428/423.1 |
| 2006/0275626 A1 | 12/2006 | Bernard et al. | |
| 2007/0201984 A1 | 8/2007 | Liston | |

(Continued)

FOREIGN PATENT DOCUMENTS

EP 2 022 942 A1 2/2009
GB 548338 10/1942

OTHER PUBLICATIONS

British Search Report issued in British Patent Application No. 0915087.1, dated Dec. 11, 2009.

(Continued)

*Primary Examiner* — Valentina Xavier
(74) *Attorney, Agent, or Firm* — Oliff PLC

(57) ABSTRACT

The present invention relates to an aerofoil having an erosion resistant leading edge. The aerofoil comprises an aerofoil main body portion and a leading edge portion. The leading edge portion comprises a plurality of functionally distinct parts, including at least; a first part for resisting abrasion of the leading edge portion, and a second part for resisting a bending force applied to the leading edge portion, and located behind the first part.

20 Claims, 2 Drawing Sheets

(56) References Cited

U.S. PATENT DOCUMENTS

2010/0162565 A1* 7/2010 Mukherji et al. ............ 29/889.1
2010/0329880 A1* 12/2010 Davis et al. ............... 416/229 R
2011/0044797 A1* 2/2011 Roberts et al. ............. 415/115
2011/0158807 A1* 6/2011 Hong ............................. 416/61

OTHER PUBLICATIONS

May 30, 2013 European Search Report issued in European Application No. 10 17 2258.

* cited by examiner

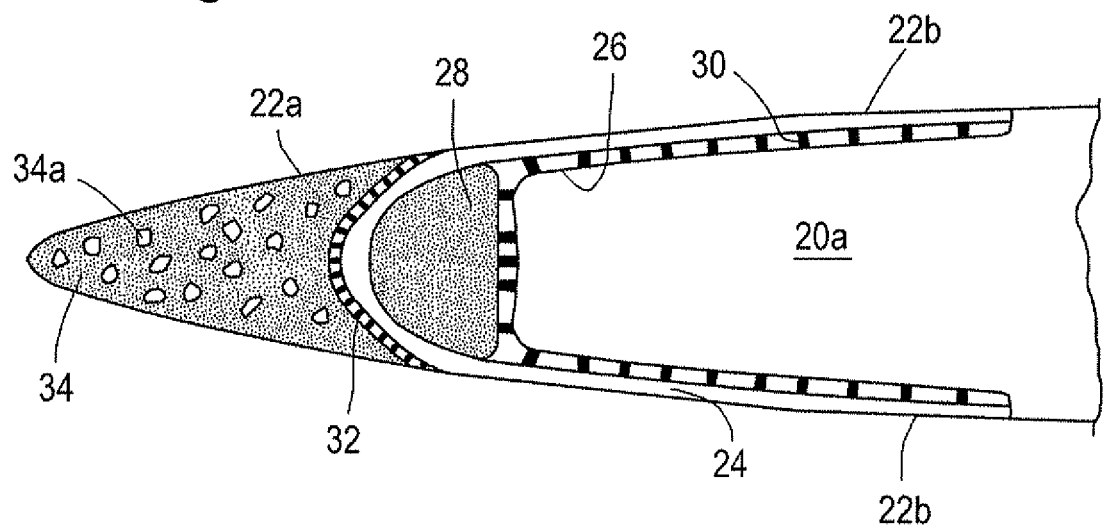
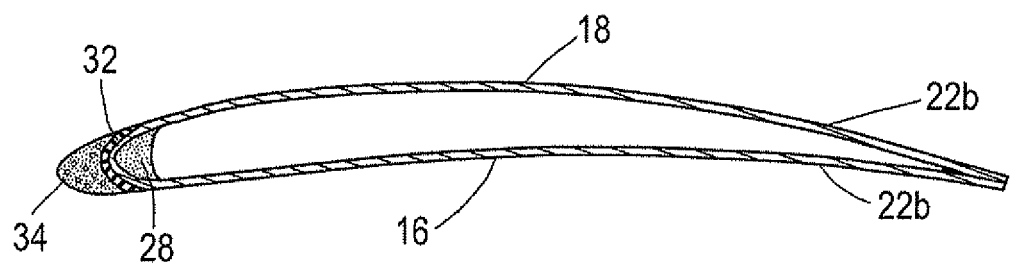

AEROFOIL WITH EROSION RESISTANT LEADING EDGE

The present invention relates to an aerofoil having an erosion resistant leading edge.

Within aero engines the leading edges of rotating and stationary aerofoils are often subjected to high-levels of erosion and impact loading. In particular fan blades and guide vanes endure harsh abrading environments including dust, sand, ice and water as well as occasional impacts from foreign bodies such as birds and other debris. Therefore the leading edges are often reinforced to make them more resilient to these environments.

Conventionally, with metallic aerofoils the choice of metal may be sufficient to ensure the appropriate resistance to the harsh environment, or else a surface coating may be added to increase the resistance. However when considering composite technologies for fan blades and guide vanes, the composite material alone is not sufficient to withstand common levels of erosion or of impacts. Accordingly, if no extra protection is afforded to the composite blade at its leading edge, damage can propagate into the more structural parts of the aerofoil. Because of this, solutions have been proposed which include wrapping pieces of metal around the leading edges. This gives some protection to erosion and also give the possibility to dress back the leading edge. It also provides protection against impact from foreign bodies. Such an approach has been widely adopted in the field of aero engines.

However, when using a metallic sheath on the leading edge of a composite aerofoil there is a need to apply separate surface treatments to both the sheath and the aerofoil and then bond the two together, which requires an extra production step. Furthermore, as the metallic sheaths are not generally structural components of the aerofoil they add weight without adding structural performance.

An additional problem arises in that air worthiness regulations specify that any separate, or separable, component must be contained within the engine and must not endanger the aircraft or any ground equipment. Therefore it is necessary to take steps to contain any metallic leading edge which has the possibility to detach during high-energy impact events and become released. This is an especially important issue when used on rotating components such as fan blades. If a metallic leading edge is released from a fan blade it can become effectively a high-energy spear which, if not contained, can pose cause a serious threat to the aircraft. Containing metallic components of this kind can necessitate an increase in both the cost and the weight of the structures required to contain them.

Where wire meshes are used as reinforcement, even though these are less likely to be released they have the disadvantage that they cannot be dressed back. This means that when the leading edge has reached its limit of erosion the entire aerofoil must be replaced, at considerable time and expense.

The present invention is defined in the attached independent claims to which reference should now be made. Further preferred features may be found in the sub claims appended thereto.

The present invention provides an aerofoil having an erosion resistant leading edge, the aerofoil comprising: an aerofoil main body portion and a leading edge portion, wherein the leading edge portion comprises a plurality of functionally distinct parts, including at least a first part for resisting abrasion of the leading edge portion, and a second part for resisting a bending force applied to the leading edge portion, and located behind the first part, wherein the first part is attached to the rest of the leading edge portion by a first mounting member comprising a first mesh, wherein the first mounting member can be heated to separate the first part from the rest of the leading edge portion.

Preferably the first part comprises a sacrificial layer including abrasion resistant material.

The abrasion resistant material may comprise particles of silicone carbide, chopped strand fibres or nano fibres.

The second part may comprise substantially unidirectional fibres.

In a preferred arrangement the leading edge portion comprises a body section and wing sections, wherein the body section includes the first and second parts and the wing sections extend over the aerofoil main body.

The leading edge portion may define a rebate and the aerofoil main body portion may comprise a key which locates within the rebate.

Preferably a second mounting member is located between the key and the rebate, the second mounting member comprising a second mesh, wherein the second mounting member can be heated to separate the leading edge portion from the aerofoil main body.

The aerofoil main body and the leading edge portion may each at least partly be formed of fibre reinforced thermoplastics material.

The aerofoil may comprise a fan blade for an aero engine.

According to a second aspect of the invention there is provided an aerofoil having an erosion resistant leading edge, the aerofoil comprising: an aerofoil main body portion and a leading edge portion, wherein the leading edge portion comprises a plurality of functionally distinct parts, including at least; a first part for resisting abrasion of the leading edge portion, and a second part for resisting a bending force applied to the leading edge portion, and located behind the first part, wherein the second part comprises substantially unidirectional fibres.

Also provided is an aerofoil having an erosion resistant leading edge, the aerofoil comprising: an aerofoil main body portion and a leading edge portion, wherein the leading edge portion comprises a plurality of functionally distinct parts, including at least; a first part for resisting abrasion of the leading edge portion, and a second part for resisting a bending force applied to the leading edge portion, and located behind the first part, wherein the leading edge portion defines a rebate and the aerofoil main body portion comprises a key which locates within the rebate.

A second mounting member may be located between the key and the rebate, the second mounting member comprising a second mesh, wherein the second mounting member can be heated to separate the leading edge portion from the aerofoil main body.

According to a further aspect there is provided a method of removing the first part from an aerofoil according to any of the preceding twelve paragraphs, the method comprising the step of heating the first mesh and separating the first part from the rest of the leading edge portion.

Preferably the first mesh is included in the first part.

The heating may be achieved by passing an electric current through the first mesh.

The invention also includes an aero engine comprising an aerofoil according to any statement herein.

Preferred embodiments of the present invention will now be described by way of example only, with reference to the accompanying diagrammatic drawings in which:

FIG. 2 shows in detailed sectional view a leading edge portion of the aerofoil of FIG. 1; and FIG. 3 shows in cross-section a second embodiment of aerofoil according to the invention.

Figure 1:
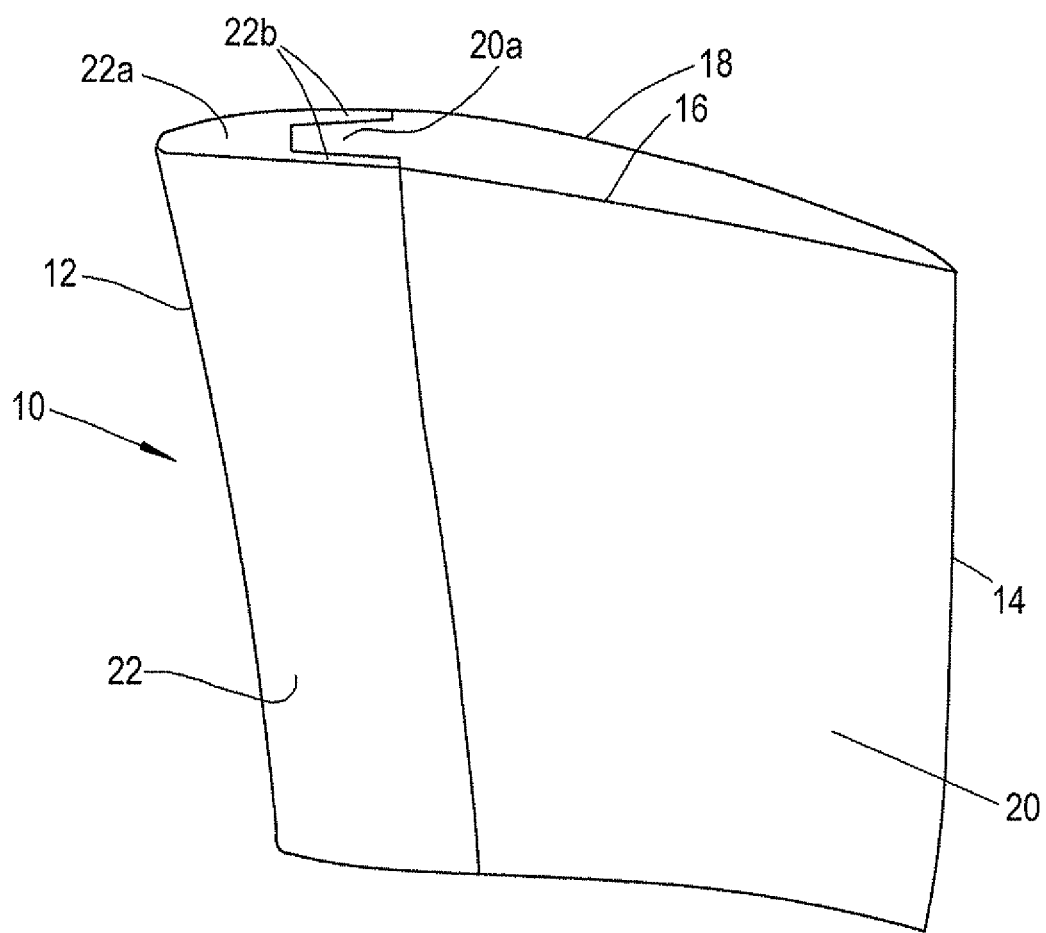
FIG. 1 shows schematically an aerofoil according to a first embodiment of the present invention.

The present invention is concerned particularly with a leading edge for an aerofoil which can be applied to a composite aerofoil to provide erosion and impact resistance, whilst allowing dressing back and even simple replacement of the leading edge. In addition, if released, the leading edge structure proposed by the present invention is designed to break up, much like the bulk of the aerofoil would, releasing only small, low energy pieces which can easily be contained.

Embodiments of the invention provide a fibre reinforced thermoplastic leading edge that is detachably mountable to a fibre-reinforced thermoplastic aerofoil such as a rotating fan blade or an outlet guide vane as used in the bypass duct of a turbo-fan aero engine. However, the invention is not limited to use with fibre reinforced thermoplastic aerofoils and may also be applicable to metallic or fibre reinforced epoxy or phenolic aerofoils.

Turning to FIG. 1, this shows generally at 10 an aerofoil having a leading edge 12, a trailing edge 14, a pressure side 16 and a suction side 18. The aerofoil 10 comprises a main body 20 and a leading edge portion 22 which are joined together as will be described below.

The leading edge portion 22 has a forward, or body section 22a and mounting parts in the form of wing portions 22b which extend rearwardly for mounting on the aerofoil main body 20. The main body 20 has a key portion 20a which is accommodated between the wing portions 22b of the leading edge portion 22.

The aerofoil main body 20 is, in this embodiment, made from fibre-reinforced thermoplastics and the leading edge portion 22 is a composite material which is functionally graded from the leading edge rearwardly towards the main body 20, so that different parts of the leading edge portion 22 are optimised for different functions.

FIG. 2 shows the leading edge portion 22 in detailed cross-section.

The wing portions 22b are formed of a lay-up 24 of fibre-reinforced thermoplastics in which the orientation of the fibres is multi-angular in order to match as closely as possible the structure of the main body 20.

The lay-up extends around the leading edge of the aerofoil from the pressure side to the suction side and defines a rebate 26 for receiving the key portion 20a of main body 20 of the aerofoil (see FIG. 1).

Between the lay-up 24 and the rebate 26 is a noodle 28 of unidirectional composite—a strip of unidirectional fibres within a matrix—which provides bending resistance and radial reinforcement for the aerofoil leading edge.

An optional wire mesh 30 locates within the rebate 26. A further wire mesh 32 wraps around the lay-up 24.

The foremost part of the protective leading edge portion 22 is a sacrificial edge layer 34 made from thermoplastic matrix material which is not reinforced with long fibres but rather is reinforced with abrasive material, such as silicon carbide particle 34a. Alternatively chopped strand fibres nano-fibres or another suitable abrasion resistant material could be used. The particles are provided in a concentration of approximately 5% or less. The concentration of the abrasive material particles is chosen so as to be at a level which provides some resistance to erosion but without being so great that the matrix becomes brittle. The maximum concentration of such particles is therefore felt likely to be around 30% with a working range of between 2 and 8% for optimum performance. For ease of manufacture, the same concentration, size and type of particles may be used along the length of the blade i.e. in the span-wise direction. However, it is possible to have different concentrations, sizes or mixtures of particles at different regions of the leading edge portion 22, though this would add cost. The preferred size of the particles is chosen to be between approximately 10 and 100 µm. Use of a smaller particle size might potentially give rise to health and safety risks while a larger particle size could potentially result in too great a discontinuity between the thermoplastic matrix and the particles themselves.

To manufacture the leading edge portion 22 the particles 34a are mixed with a liquid matrix which is either extruded hot or formed or injection or compression moulded into shape. The matrix with the particles is preferably joined to the wire mesh 32 whilst it is being formed into shape.

The length between the apex of the sacrificial layer 34 and the apex of the wire mesh 32 is typically between 5 and 20 mm. Extra sacrificial material 34 can be provided to allow a dress back (which is usually no more than 3 mm) in order to allow a precise aerodynamic profile to be achieved.

The sacrificial layer 34 is joined to the rest of the leading edge portion 22 with the wire mesh 32. This facilitates the easy removal and refitting of the sacrificial layer in case of damage or excessive wear. The mesh 32 can be formed of any appropriate materials such as for example copper, nickel or inconel, and ideally it has a radius of curvature that is around half of the thickness of the leading edge at the location of the mesh.

Simple removal of the sacrificial layer may be achieved by passing an electrical current through the wire mesh 32 until it reaches a temperature above the melting point of the matrix material (which is a thermoplastic) after which the sacrificial layer 34 can readily be removed and a new one fitted. This method can also conveniently be used to attach the entire leading edge portion 22 to the aerofoil main body using the optional mesh 30, provided that the leading edge portion and the aerofoil body have the same thermoplastic (family) matrix. For the mesh 30 a size of between 0.5-5 mm should be used and preferably a range of 2-3 mm, which is sufficiently small to heat and melt the resin without damaging the underlying wing portions 22b but will still provide a good mechanical key when cooled.

The wing portions 22b are preferably a laminated composite arranged such that the layers are quasi-isotropic—i.e. 0°, + and −45° and 90° fibre lay-ups all being present in the lay-up 24. The fibres should at least be multi-angular, or even woven, in order to inhibit potential damage when the leading edge portion 22 is removed from the aerofoil main body 20.

In the above described embodiment the leading edge portion 22 is a separate component from the aerofoil main body 20, the two components being co-cured or co-bonded together. However, it is possible to achieve similar functional effects with a fully integrated leading edge portion.

FIG. 3 shows an alternative in which the leading edge portion and aerofoil main body are formed integrally, the wing portions 22b being fully extended rearwardly so as to form the entire pressure 16 and suction 18 surfaces. Again a sacrificial edge layer 32, a noodle 28 and a mesh 32, for easy removal of the sacrificial layer 34, are provided.

One advantage of the present invention is a potentially lighter leading edge when compared with the equivalent metallic blade. Additionally, any break-up and or release of the components will be in circumstances of lower energy such that the component will disintegrate and not remain in one single potentially damaging piece. The cost of repair will be less since only the foremost part of the leading edge has to be replaced and also the aerofoil is provided with a greater resistance to impact, since the sacrificial layer 34 also acts as a crumple zone before the impact event is able to reach the structural part of the aerofoil. Finally, it is less likely that the leading edge portion would be released as, in most circumstances, it is fundamentally the same material as the underlying aerofoil main body.

Whilst the above described embodiments have been considered in relation to fan blades or guide vanes, the skilled person will be aware that the invention is equally applicable to other aerofoil components such as engine section stators, and to leading edges of the splitter fairing and of vane packs such as an outlet guide vane or obscuration vane set.

The invention claimed is:

1. An aeroengine fan blade having an erosion resistant leading edge, the fan blade comprising:
   an aerofoil main body portion and a leading edge portion, wherein the leading edge portion comprises a plurality of functionally distinct parts, including at least:
   a first part for resisting abrasion of the leading edge portion, and
   a second part for resisting a bending force applied to the leading edge portion, and located behind the first part, wherein the first part is attached to a remaining portion of the leading edge portion by a first mounting member comprising a first mesh, wherein the first mounting member is heated to separate the first part from the remaining portion of the leading edge portion.

2. The fan blade of claim 1, wherein the first part comprises a sacrificial layer including abrasion resistant material.

3. The fan blade of claim 2, wherein the abrasion resistant material comprises particles of silicone carbide, chopped strand fibres, or nano-fibres.

4. The fan blade of claim 1, wherein the second part comprises substantially unidirectional fibres.

5. The fan blade of claim 1, wherein the leading edge portion further comprises a body section and wing sections, wherein the body section includes the first and second parts, and the wing sections extend over the aerofoil main body.

6. The fan blade of claim 1, wherein the leading edge portion defines a rebate, and the aerofoil main body portion comprises a key which locates within the rebate.

7. The fan blade of claim 6, wherein a second mounting member is located between the key and the rebate, the second mounting member comprising a second mesh, and the second mounting member can be heated to separate the leading edge portion from the aerofoil main body.

8. The fan blade of claim 1, wherein the aerofoil main body and the leading edge portion are each at least partly formed of fibre reinforced thermoplastics material.

9. A gas turbine engine comprising the fan blade of claim 1.

10. A method of removing a first part from an aerofoil having an erosion resistant leading edge, the aerofoil comprising:
    an aerofoil main body portion and a leading edge portion, wherein the leading edge portion comprises a plurality of functionally distinct parts, including at least:
    the first part for resisting abrasion of the leading edge portion, and
    a second part for resisting a bending force applied to the leading edge portion, and located behind the first part, wherein the first part is attached to a remaining portion of the leading edge portion by a first mounting member comprising a first mesh, wherein the first mounting member is adapted to be heated to separate the first part from the remaining portion of the leading edge portion;
    the method comprising:
    heating the first mesh; and
    separating the first part from the remaining portion of the leading edge portion.

11. The method of claim 10, wherein the first mesh is included in the first part.

12. The method of claim 10, wherein the heating is achieved by passing an electric current through the first mesh.

13. The method of claim 10, wherein the first part comprises a sacrificial layer including abrasion resistant material.

14. The method of claim 10, wherein the second part comprises substantially unidirectional fibres.

15. The method of claim 10, wherein the leading edge portion further comprises a body section and wing sections, wherein the body section includes the first and second parts, and the wing sections extend over the aerofoil main body.

16. The method of claim 10, wherein the leading edge portion defines a rebate, and the aerofoil main body portion comprises a key which locates within the rebate.

17. The method of claim 10, wherein the aerofoil main body and the leading edge portion are each at least partly formed of fibre reinforced thermoplastics material.

18. The method of claim 10, wherein the mesh is embedded in a matrix material, the method further comprising passing an electrical current through the mesh until it reaches a temperature above a melting point of the matrix material.

19. The method of claim 18, wherein the matrix material is a thermoplastic.

20. A fan blade having an erosion resistant leading edge, the fan blade comprising:
    an aerofoil main body portion and a leading edge portion, wherein the leading edge portion comprises a plurality of functionally distinct parts, including at least:
    a first part for resisting abrasion of the leading edge portion, and
    a second part for resisting a bending force applied to the leading edge portion, and located behind the first part, wherein the first part is attached to a remaining portion of the leading edge portion by a first mounting member comprising a first mesh, wherein the first mounting member is heated to separate the first part from the remaining portion of the leading edge portion.

* * * * *